US012504983B2

(12) United States Patent
Bleve et al.

(10) Patent No.: US 12,504,983 B2
(45) Date of Patent: Dec. 23, 2025

(54) SUPERVISORY DEVICE WITH DEPLOYED INDEPENDENT APPLICATION CONTAINERS FOR AUTOMATION CONTROL PROGRAMS

(71) Applicant: Siemens Aktiengesellschaft, Munich (DE)

(72) Inventors: Francesco Bleve, Milltown, NJ (US); Holger Strobel, Steinbach (DE)

(73) Assignee: Siemens Aktiengesellschaft, Munich (DE)

( * ) Notice: Subject to any disclaimer, the term of this patent is extended or adjusted under 35 U.S.C. 154(b) by 814 days.

(21) Appl. No.: 17/615,729

(22) PCT Filed: Jun. 4, 2019

(86) PCT No.: PCT/US2019/035313
§ 371 (c)(1),
(2) Date: Dec. 1, 2021

(87) PCT Pub. No.: WO2020/246960
PCT Pub. Date: Dec. 10, 2020

(65) Prior Publication Data
US 2022/0237007 A1    Jul. 28, 2022

(51) Int. Cl.
*G06F 9/455* (2018.01)
*G05B 19/418* (2006.01)
*G06F 9/54* (2006.01)

(52) U.S. Cl.
CPC ......... *G06F 9/455* (2013.01); *G05B 19/4185* (2013.01); *G06F 9/545* (2013.01); *G05B 2219/32404* (2013.01)

(58) Field of Classification Search
None
See application file for complete search history.

(56) References Cited

U.S. PATENT DOCUMENTS

| 7,681,134 | B1 | 3/2010 | Grechishkin et al. |
| 8,977,735 | B2 * | 3/2015 | Salinas ............... H04L 67/1097 711/6 |
| 9,912,739 | B1 * | 3/2018 | Haas ................... G06F 9/45558 |
| 10,055,578 | B1 * | 8/2018 | Marquardt ............. G06F 21/44 |

(Continued)

OTHER PUBLICATIONS

International Search Report corresponding to PCT application No. PCT/US2019/035313; 4 pages.

*Primary Examiner* — Aimee Li
*Assistant Examiner* — Zujia Xu

(57) ABSTRACT

A system and method for supervisory and control support in an industrial automation system, including a supervisory device with a software stack having a host operating system and a plurality of independent application containers Each container includes a modular application platform being associated with a base functionality for the supervisory device and a guest operating system layer integrated with the modular application platform according to a system integration. A one-time integration of system dependencies is executed during development of the container. The independent application containers are portable for direct deployment in an operating system of a type different than that of the host operating system and can run unchanged without requiring any change to component artifacts.

15 Claims, 7 Drawing Sheets

(56) References Cited

U.S. PATENT DOCUMENTS

| | | |
|---|---|---|
| 2005/0060722 A1 | 3/2005 | Rochette et al. |
| 2005/0216922 A1* | 9/2005 | Mogilevsky .......... G06F 40/103 |
| | | 719/328 |
| 2011/0179388 A1* | 7/2011 | Fleizach ............. G06F 3/04886 |
| | | 340/407.1 |
| 2011/0209064 A1* | 8/2011 | Jorgensen ............... G06F 9/455 |
| | | 709/227 |
| 2016/0371127 A1* | 12/2016 | Antony ............... G06F 11/0793 |
| 2016/0378449 A1 | 12/2016 | Khazanchi et al. |
| 2017/0091477 A1 | 3/2017 | Peppe et al. |
| 2017/0257432 A1* | 9/2017 | Fu ....................... H04L 67/1014 |
| 2018/0062908 A1* | 3/2018 | Rachamadugu .... G06F 9/45558 |
| 2018/0137296 A1 | 5/2018 | Cahana et al. |
| 2018/0189114 A1* | 7/2018 | Jiang ..................... G06F 9/4843 |
| 2018/0336123 A1* | 11/2018 | Benes ................. G06F 11/3692 |
| 2019/0332777 A1* | 10/2019 | Edwards ................... H04L 9/14 |
| 2022/0270735 A1* | 8/2022 | Michelich ............... G06F 9/453 |

* cited by examiner

SUPERVISORY DEVICE WITH DEPLOYED INDEPENDENT APPLICATION CONTAINERS FOR AUTOMATION CONTROL PROGRAMS

TECHNICAL FIELD

This application relates to automation control. More particularly, this application relates to a supervisory device having deployed independent application containers for automation control programs.

BACKGROUND

In the industrial automation industry, complex systems like Supervisory Control and Data Acquisition (SCADA) are commonly deployed to supervise and support an industrial or manufacturing process that involves multiple levels of various control systems consisting of devices such as multi-purpose programmable logic controllers (PLCs), embedded Edge devices, headless gateways, Human Machine Interface (HMI) panels, industrial personal computers (PCs), on-premises servers, and cloud infrastructure devices. Such control systems may supervise and support physical systems of field devices such as conveyors, robotic tools and various sensors that monitor the industrial or manufacturing process. To facilitate the supervisory and control functionality, a supervisory device is deployed with a software stack integrated to a designated operating system (OS), where the software stack is comprised of components requiring a complex integration of interdependencies. Both inter-component integration and component-to-operating system integration is required.

FIG. 1 shows an example of a typical software stack for a supervisory device in an industrial automation control system. In this example of a monolithic stack 111, the connectivity to field device 131 is handled by a connectivity layer 122 having various drivers. Next moving upward, the runtime layer 124 gathers data from one or more field devices 131 and offers it through multiple services (e.g., real-time publish/subscribe (pub/sub), logging, alarms, etc.). User 132 of the runtime services may operate graphical user interface (GUI) clients running in visualization layer 126, to present an up-to-date overview of the manufacturing process to the user 132. The visualization layer 126 may service one or more rendering hosts, and may include user-defined applications, such as edge applications. The downside of deploying a monolithic stack is that once it is integrated, the components are so merged with a loss of independence such that any needed modifications to a subcomponent will require a complete re-integration of all interdependencies starting from the beginning of the process.

With the advent of Edge, Fog and Cloud computing, any automation software stack (e.g., such as a human-machine interface (HMI) stack or a Supervisory Control And Data Acquisition (SCADA) stack) needs to be portable and versatile enough to be easily deployed in a myriad of different target hardware platforms (e.g., multi-purpose programmable logic controllers (PLCs), embedded Edge devices, headless gateways, HMI panels, industrial PCs, on-premises servers, cloud infrastructures and many more), where each have various software operating systems (e.g., different Linux-based operating systems, common Linux-based operating systems with different release versions).

A first revolutionary attempt in reducing automation system complexity has been the switch from monolithic software stack to modular and more abstracted software architectures. The advent of modularization allowed for clearly drawn boundaries among all layers and to design more abstracted components which could be reused across multiple product lines, with cross-modules interactions being achieved through carefully designed interfaces. While modularization surely marked a turning point in the industry, many problems remain unsolved. System integration remains a major challenge in cases where the full software stack needs to be provisioned to a fresh operating system (e.g., when an existing supervisory device is scheduled for an update for deploying a new version of an operating system or a different operating system, or when introducing a new operating system to serve a new supervisory device as a modification or add-on to the industrial system).

FIG. 2 shows an example of a modular software stack for target devices in industrial automation. Currently, when provisioning a software stack 201 for a fresh operating system installation in a device A with a hardware platform 271, each of the application modules 210, including runtime module 211, visualization module 221 and other module 231, must be individually deployed and integrated to the target operating system 261 to ensure system compatibility and runtime correctness. As shown in FIG. 2, the same set of modules 210 of modular software stack 201 could be developed for deployment in multiple devices that run different operating systems, such as operating system 262 for a device B with hardware platform 272, and operating system 263 for another target device hardware platform 273. For example, device A may run on operating system 261, which is a fresh operating system replacement. As another example, device A may be part of a new supervisory and control system being deployed, and each of the application modules 210 will need to be integrated for functioning with the new device A and its operating system 261. Each module 210 for integration mainly consists of three groups of artifacts: executable binaries, libraries, and resources (e.g., configuration files, images). As part of a system integration 251, dependencies on the system library for binaries, libraries, and resources of the modules 211, 221, 231 need to be established by installing to the right locations, and configuration files must be set accordingly, where any incongruence may result in undesirable runtime misbehaviors. The conventional approach requires each module 211, 221, 231 to be integrated at integration time through an installer (i.e., an installation script) that copies and installs all artifacts to the right location in the system. However, the binaries and libraries may have dependencies on other artifacts, which is commonly the responsibility of the target system to provide (e.g., OpenGL, XServer, C/C++ runtime libraries, Java/Python/NodeJS runtimes, etc.). Since the component artifacts are built at different times, and typically by a different developer team than when integrated in the target system, it is not uncommon for the target device to have the wrong version of each dependency pre-installed. In some cases, the dependency is not pre-installed at all. Because each operating system 261, 262, 263 is treated uniquely, in relation to its operating system or hardware configuration, the system integration 251, 252, 253 requires many iterations to resolve the dependencies and to identify the best fitting strategy for each target device. These difficulties lead to runtime errors when artifacts are misplaced during the integration time by an integration team, due to unfulfilled dependencies or resources (e.g., configuration files, images, etc.) which cannot be found by the modules.

Following the system integration 251, there is cross-module integration, by which individual modules 211, 221, 231 are integrated together to form the final software stack

201. Just as for the overall system integration, major challenges exist to address the intrinsic differences of each target operating system 261, 262, 263, which may affect how the individual components of modules 211, 221, 231 interact with each other (e.g., different OS distribution, system libraries, network configurations, memory configurations, file systems). Multi-OS compatibility of the stack 201 is not possible unless explicitly supported by each individual module/layer.

In summary, current automation and control programs are constructed with very complex software stacks that are burdened by cumbersome integration and configuration processes. Portability of these programs is not achievable without overcoming intrinsic inefficiencies and insufficient component modularization.

Currently, deployment of automation software components in a fresh operating system is achieved by tailoring the integration strategy to perfectly match the characteristics of the operating system platform, such as Microsoft Windows, Ubuntu, Debian, CentOS to name a few examples. FIG. 3 shows an example of a flowchart diagram for the development process of software components for an automation system. System configuration 301 may include configuration of resources (e.g., network, file system, memory), and identification of required system dependencies. For example, a particular module execution may require Java runtime to be deployed. As another example, a web server may require Node.JS to function. Another example may be a Rendering Host that needs OpenGL libraries to render content on a display screen. The resources for such modules may be allocated as being provided by the hosting system, rather than inclusion in the application module. The identified dependencies must then be installed on the target system, with crucial attention given to the version requirements of each individual system library to avoid runtime misbehaviors. Additionally, installed dependencies must be properly configured so they can be found by the modules that need to utilize them. These steps of the system configuration 351 are conventionally performed as a manual process at integration time for each target system. Following the system configuration 301, each software module is integrated with the system for the system integration 302 as explained above. For the system integration of each module to the operating system, component functionalities then need to be verified through a set of pre-defined tests to assure no runtime misbehavior is registered. After all modules have been integrated and verified, a cross module integration 303 is performed to interconnect all of the application modules. This assures that the infrastructure for making inter-module communications is properly configured (e.g., networking).

While all of these steps may not be necessary for every operating system deployment, any one of the steps is extremely time consuming, and risks strong likelihood of crashes and runtime misbehaviors arising from incongruent or conflicting configurations that may go unnoticed during the integration process. Part of the state-of-the-art solutions for tackling the problem is the use of installers or installation scripts, which may simplify the installation process of automation software stacks across multiple devices. However, issues can still arise at runtime if the system is misconfigured. Indeed, improvements to current integration processes are wanted. With respect to cross-OS compatibility, current solutions are only capable of dealing with the problem exclusively at compile time through the usage of cross-OS frameworks (e.g., Qt Framework). No solution currently exists that allows for easy deployment of the same automation software stack across multiple operating systems.

SUMMARY

Aspects according to embodiments of the present disclosure include a supervisory device for supervisory and control support in an industrial automation system, where the supervisory device includes a processor, and a computer readable medium having stored thereon a software stack that includes a host operating system, and a plurality of independent application containers. Each container includes a modular application being associated with a base functionality for the supervisory device and a plurality of components each configured to perform a subfunctionality, wherein each component has artifacts including a set of binaries, libraries and resources. Each container further includes a guest operating system layer integrated with the artifacts of the components, the guest operating system being platform-agnostic to the operating system. The software stack further includes a container daemon configured to execute a one-time system integration between the guest operating system and the component artifacts by generating a hierarchy of image layers during development of each container to create a container image artifact of each container. For each container, the container daemon executes the container image artifact at runtime for integrating the container to the host operating system. The independent application containers are portable for direct deployment in an operating system of a type different than that of the host operating system and can run unchanged without requiring any change to component artifacts.

BRIEF DESCRIPTION OF THE DRAWINGS

Non-limiting and non-exhaustive embodiments of the present embodiments are described with reference to the following FIGURES, wherein like reference numerals refer to like elements throughout the drawings unless otherwise specified.

DETAILED DESCRIPTION

Methods and apparatuses of the present disclosure provide an improved system integration process of software applications for supervisory devices of an industrial automation system. Independent application containers are the product of a one-time system integration rather than separate system integrations of modular applications for each target system platform. This avoids challenges arising from intrinsic differences characterizing each target system platform, in that the disclosed container-based deployment process requires only a single integration that is unrelated and abstracted from the final target operating system platform. A guest operating system component is introduced for inclusion within the independent application container, where the guest operating system is platform-agnostic to the target operating system. The guest operating system for each container may be generated as a separate layer at the development stage for the application platform, and with a one-time integration with the application modules, the container is ready to be deployed to a wide range of host operating systems. At runtime, the container becomes integrated with a host operating system and is handled by a container daemon application, avoiding troublesome configuration conflicts between application module components and the host operating system. As a result, an atomic application container is ready to be executed "out of the box" on any architecturally compatible platform having an installed container daemon application.

Figure 1:
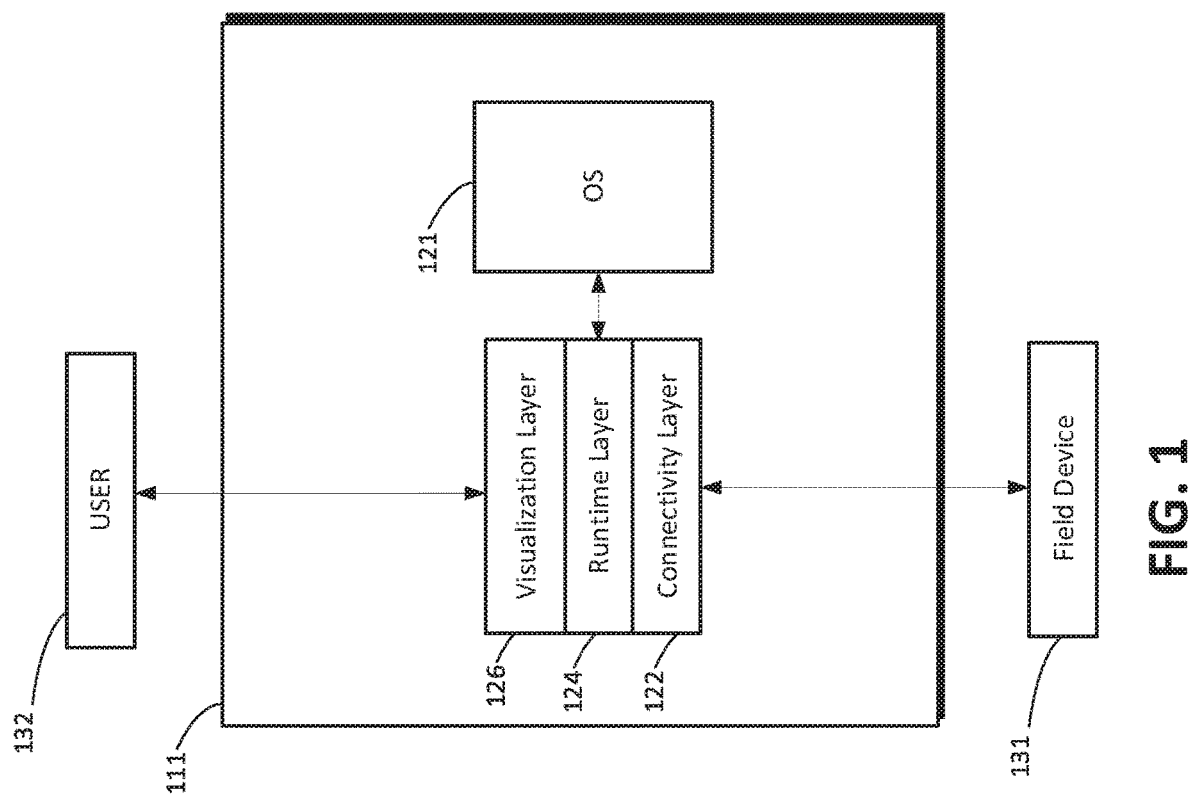
FIG. 1 shows a diagram of an example of a conventional monolithic software stack used for industrial automation.
Figure 2:
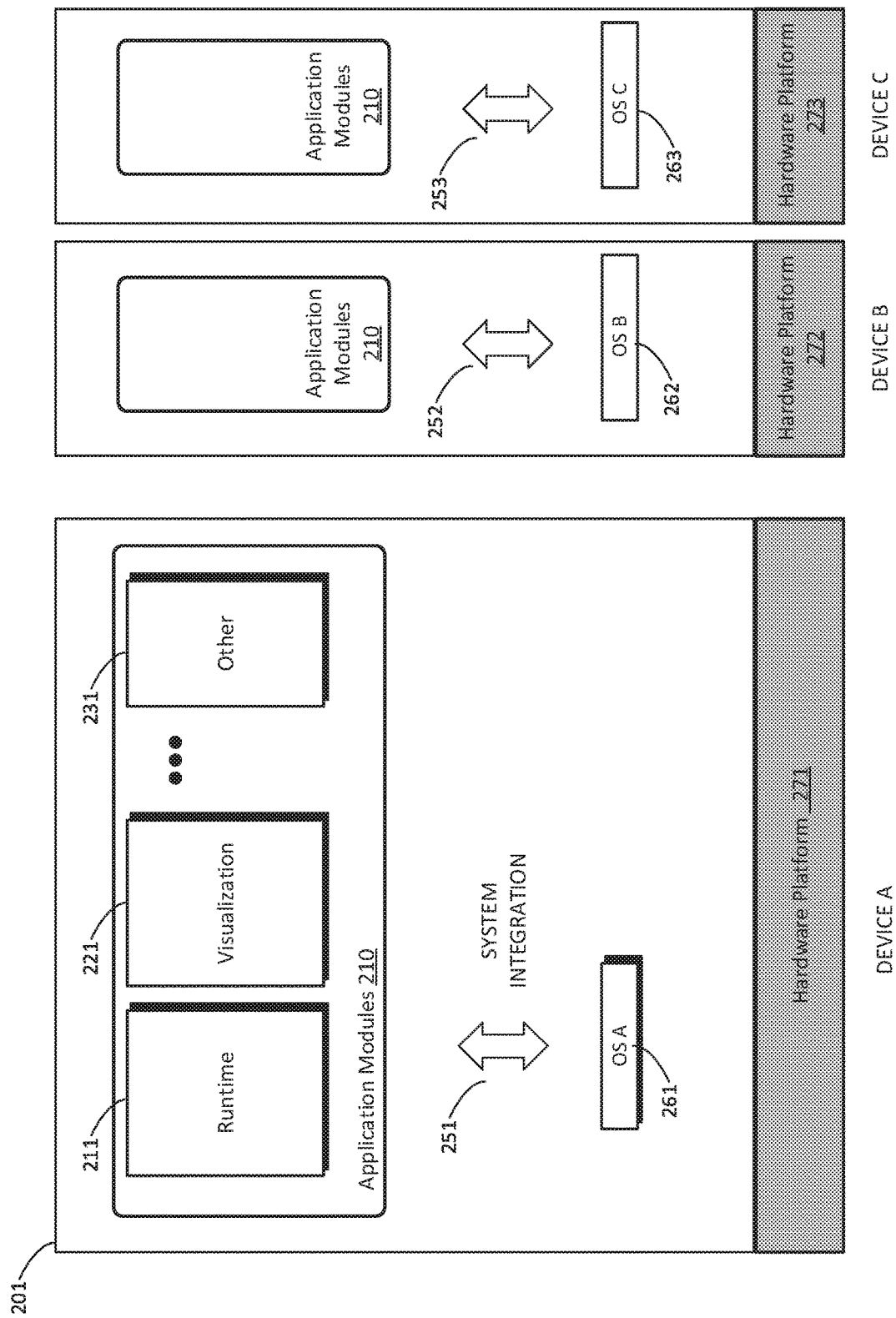
FIG. 2 shows a diagram of an example of a conventional modular software stack used for industrial automation.
Figure 3:
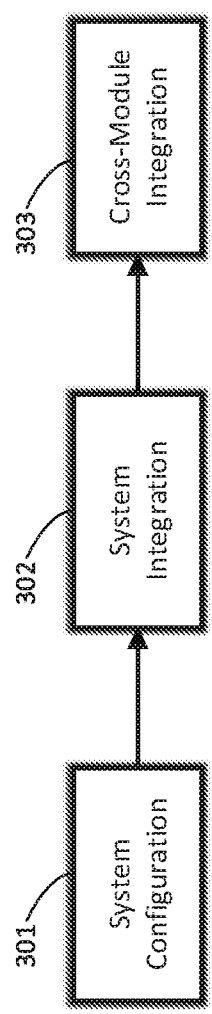
FIG. 3 shows a flowchart diagram of an example process for development of software components for industrial automation.
Figure 4:
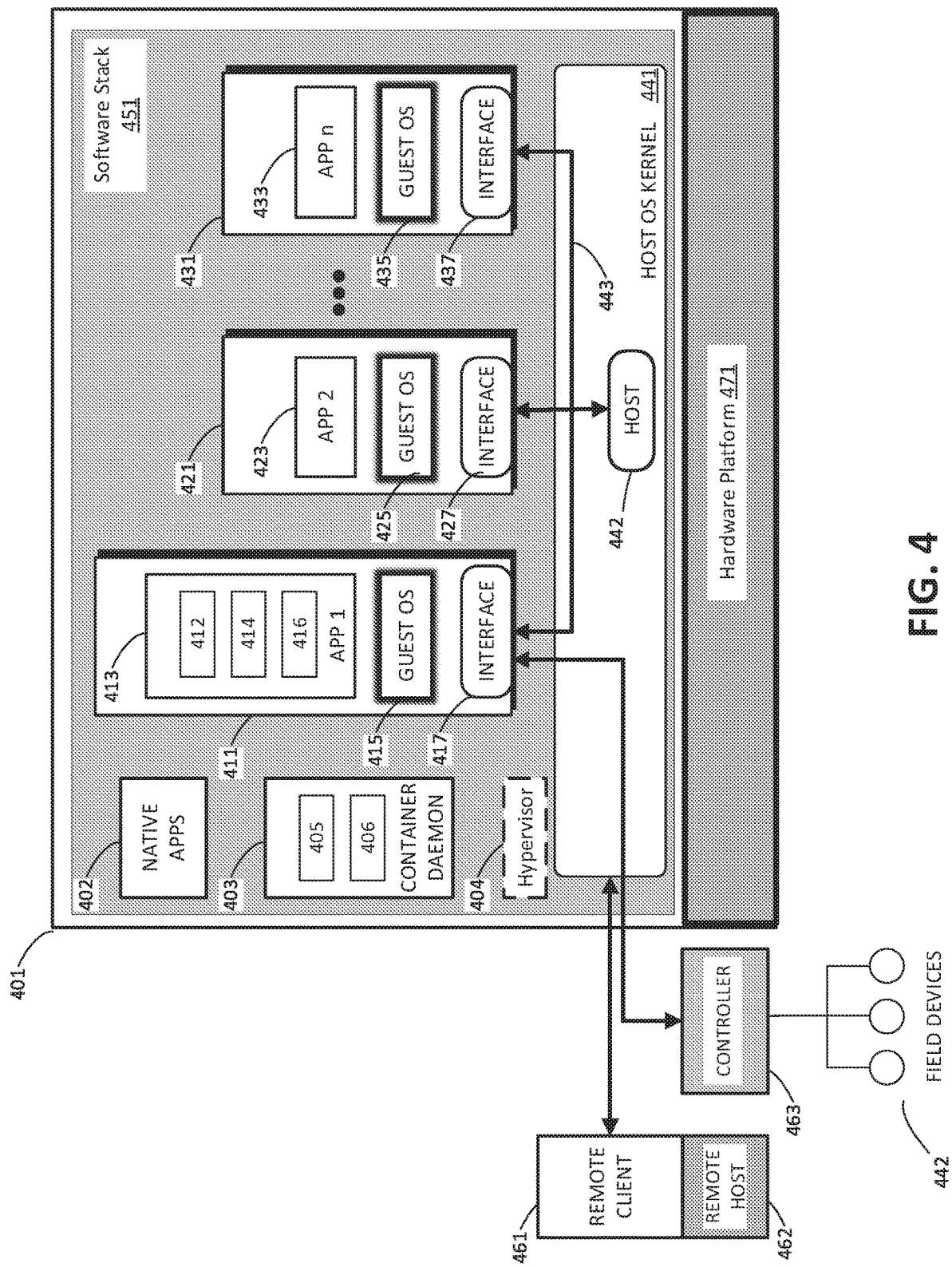
FIG. 4 shows a diagram of an example of a supervisory device having a deployed software stack using independent application containers in accordance with embodiments of the present disclosure.

FIG. 4 shows a diagram of an example of supervisory device having a deployed container-based software stack using independent application containers in accordance with embodiments of the present disclosure. A supervisory device 401 (e.g., an HMI unit) for an automation control system is shown having a software stack 451 deployed on a hardware platform 471 for supervision and control functionality in coordination with interconnected control systems, such as remote client 461 (e.g., a web-based user interface) running on a remote host 462 hardware platform (e.g., a remote personal computer (PC)), or a controller 463 (e.g., a programmable logic controller). The software stack 451 may include native applications 402, a container daemon 403, an optional hypervisor 404, application containers 411, 421, 431, and a host operating system kernel 441.

In an embodiment, during development of the software stack for the supervisory device 401 given a target device 401 with a predetermined operating system, a technical problem to be solved is to avoid repeated system integrations for the same application module when deploying to a new target device having a fresh operating system. To solve the technical problem, an application container is constructed and configured with the application components fully system integrated with a guest operating system, which can be deployed on the target device memory and will execute when the device is turned on.

Figure 7:
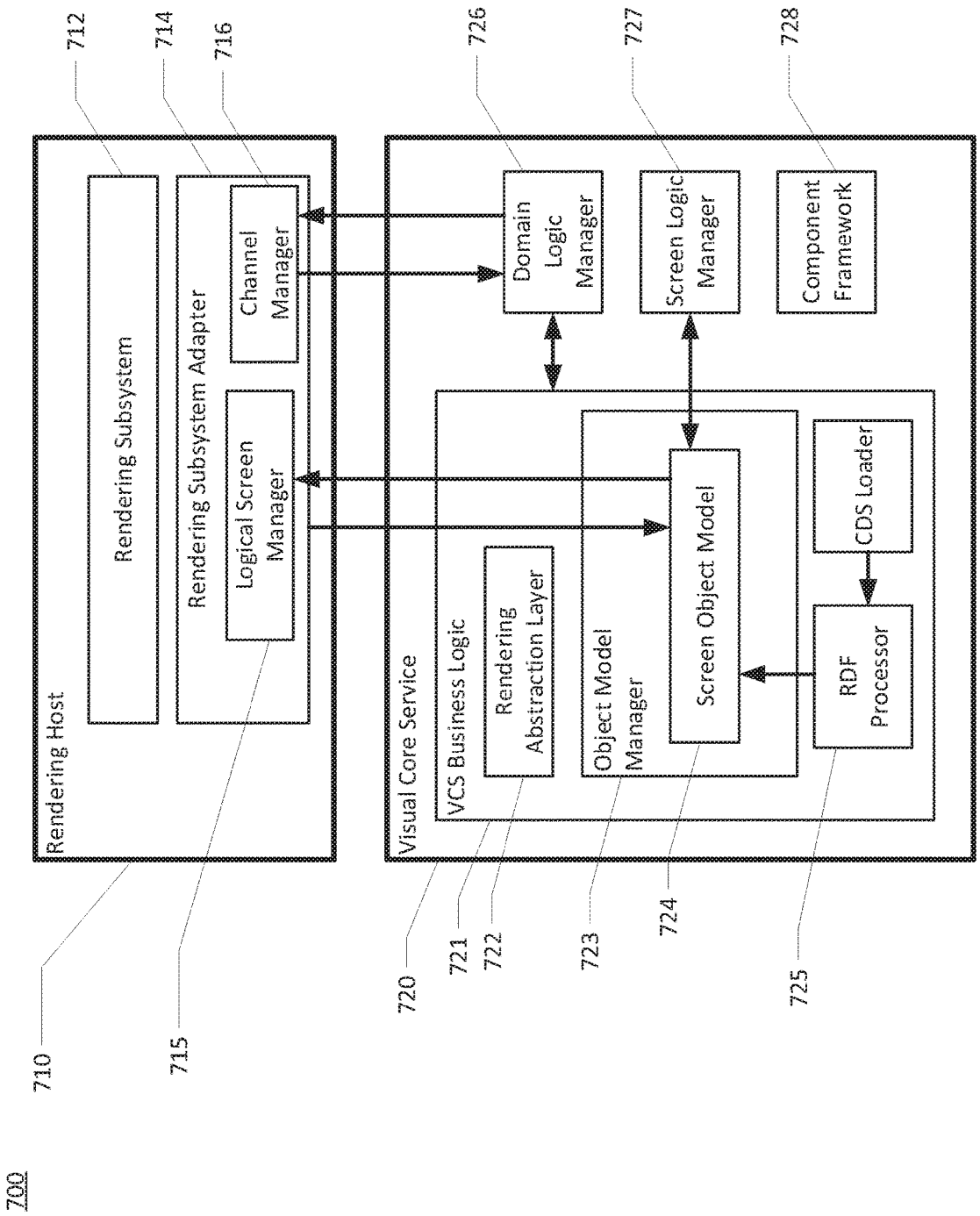
FIG. 7 shows a block diagram of examples for application container component configuration in accordance with embodiments of the present disclosure.

The software stack 451 includes a plurality of native applications 402 (e.g., user applications and/or system applications) may be developed and stored outside of any container. Such native applications 402, which may include user and/or system applications, integrate directly to the host operating system via an abstraction layer (not shown). A set of modular applications APP1, APP2, . . . APPn may be identified and allocated according to a respective base functionality for the supervisory device 401. For example, a first application module 413 may include components, such as presented in Table 1, configured to execute runtime server functions. A second application module 423 may include components, such as shown in FIG. 7, configured to execute a web-based rendering host 710 to expose a user interface to a remote browser. In an embodiment, application module 710 includes components Rendering Subsystem 712, and Rendering Subsystem Adapter 714 with logical screen manager 715 and channel manager 716. Returning to FIG. 4, a third application module 433 may include components configured for visualization functions, such as executing a graphical user interface (GUI) rendering host (e.g., the rendering host may be implanted using a Qt framework application on a rich client platform) that exposes the user interface on a main display (e.g., a display screen) of the supervisory device 401. As an example, FIG. 7 shows a Visual Core Service (VCS) application module 720 configured to visualization functions with components Domain Logic Manager 726, Screen Logic Manager 727, component Framework 728, and VCS Business Logic component 721 having a rendering abstraction layer 722, an object model manager 723, a screen object model 724, RDF processor 725, and CDS Loader 729.

TABLE 1

| Component name | Description |
| --- | --- |
| IL API | The internal programming interface used within APP development team as well as by WinCC OA customers providing APP-based interfaces. |
| Service Remoting Infrastructure | The APP Service Remoting Infrastructure defines a model for building-provisioning and using APP services within the APP environment |
| CHROM API/ APP SDK | This programming interface provides interface oriented data objects and data providers according to a well-defined programming meta model. The APP SDK basically contains the CHROM API and all its features. |
| Storage/Logging Framework | Provides a common framework for all logging functionality, storage management as well as storage abstraction. |
| Datasets | Provides all the functions required for managing simple datasets that do not include conditions or time references. |
| Tag Logging | Logging component to read/write of tag values over time. |
| Alarm Logging | Logging component to read/write of alarm state changes (alarm events) overtime. |
| Dataset Logging | Logging component to read/write of dataset (e.g. actually used dataset values). |
| SQLite Plug-in | Adapter for using SQLite database for logging and persistency. |
| SQL Server Plug-in | Adapter for using SQL Server database for logging and persistency. |
| Persistency (SCADA) | Manages persistency of current tags and alarms (to cope with restarts or power offs). |
| Distribution | Provides basic mechanisms for runtime collaboration. |
| Redundancy | Monitors state of redundant systems and controls switches. |
| Localization | Provides localized versions of text, images, and other localizable resources. Also provides server-side evaluation of resource lists. |
| CDS | Configuration Data Service (CDS) provides access to file-based resources (e.g. screen, fonts, etc.). |

TABLE 1-continued

| Component name | Description |
| --- | --- |
| Communication Security | Covers all measures and mechanisms that create a secure communication between cooperating devices |
| UMC Integration | Supports managing system users and their roles. |
| Access Control | Manages and authorizes access of users to certain functionality. |
| OPC Server | Allows OPC clients (UA, DA, A&E, HDA) to e)change data with an IOWA system. |
| ComDriver API/Framework | A framework covering common logic for integration of communication drivers. |
| ComDriver | Communication driver for interaction with PLCs |
| OPC ComDriver | Communication driver for interaction with OPC (UA, DA, A&E, HDA) servers |
| SNMP ComDriver | Communication driver for interaction with SNMP-enabled devices |
| 3rd party Communication drivers | Communication driver for interaction with PLCs of 3rd parties. |
| ASCII Import\Export | ASCII allows exporting parts or complete project configuration in text format, use 3 rd party tools to do mass parameterization and import configuration data back into the system. |
| Audit Trail | Enables tracking audit relevant system events and actions performed by system users. |
| Server-side Reporting | Provides means to create various kinds of reports. |
| PH Integration | Ready to use the Process Historian |
| System diagnosis | Evaluates the state of the complete control system (HMI, automation system, peripheral devices) and its depending HW and SW components. |
| Browsing Service | Searching/filtering on Name Service data will always be possible, view-extended addressing is only possible with the Browsing feature enabled |
| Process Monitor | Checks the system configuration for the managers to start and starts all managers in the configured order. |

In an embodiment, development of application module containers may be assigned to developer specialists for the respective application functionality so that the one-time integration for each container is handled by an expert, unlike conventional system integration which is typically executed by a team of system integrators who were not involved with application development. As a result, the integration and verification process can be more efficient in avoiding mismatched configurations and interdependencies of application components.

Each container includes a guest operating system 415, 425, 435 which is integrated with artifacts of application components and is platform-agnostic to the target host operating system designated for the supervisory device 401. For example, container 411 includes application 413 with component artifacts such as binaries 412, libraries 414, and resources 416, all of which are integrated to guest operating system 415. During a one-time system integration executed by container daemon 403 between the guest operating system 415 and component artifacts of a container, a hierarchy of image layers is generated during development of each container to create a container image artifact of each container. This integration replaces the conventional integration to a target platform operating system, such as OS platform 471. As a result, a separation is established between the guest OS and the host OS. In an embodiment, the guest operating system 415 may be defined during construction of the container artifact image. The selection of the type of guest operating system 415 may be platform-agnostic due to the functionality of the container daemon 403. While the host operating system may be a full Linux distribution, the guest operating system 415 may consist of the hierarchy of layers that, when a container 411 is started by container daemon 403, are overlaid together with application 413 layers to form a merged filesystem bundle, that is then mounted on top of the host filesystem. Additionally, the guest operating system 415 and host operating system may share the host operating system kernel 441.

A container daemon 403 provides functionality for the container both at development stage and at runtime. During development of software stack 451, container daemon 403 may construct each container image artifact 411, 421, 431 for each application 413, 423, 433. The container daemon 403 comprises program modules that execute the system integration processes during the development stage, and other program modules that execute the container image artifact during runtime of the operation stage (e.g., a runtime manager). In an embodiment, multiple container integration and orchestration can be achieved using a compositor module 405 and an orchestrator module 406, respectively. The compositor module 405 may perform a bridging of multi-component applications so that the application containers start all at once. Inter-connection among containers may be achieved via inter-process communication techniques offered by the container runtime manager. For a software stack to be divided into multiple containers, a prerequisite may be defined such that the communication is split at section lines of containers by using one of several options provided, including network (e.g., TCP/IP), shared memory, or file mapping. For example, a TCP/IP bridged network may be formed as shown in FIG. 4 including interfaces 417, 427, 437 and host kernel interface 442. The orchestrator module 406 may control application lifecycle of individual containers or multiple containers by controlled starting and close monitoring. For example, orchestrator module 406 may start the containers in response to a user request and may monitor the containers throughout execution. In response to a premature termination, the orchestrator 406 may be programmed to restart the container application. Accordingly, the orchestrator module 406 eases the startup procedure for container-based applications.

In an embodiment, based on the way that container daemon 403 integrates an application with guest operating system 415 for operating on the host operating system kernel 441, there are increased security and resource controls as a result. Containers 411, 421, 431 may run directly on host operating system kernel 441 with no additional abstraction layer required. Host operating system kernel 441 may include a namespaces kernel feature for achieving isolation between the containers. For example, the namespaces feature may dictate what set of resources is visible to a specific process. With isolation among the application containers 411, 421, 431, a process running within one container cannot see or affect processes running within the remaining containers, or on the host operating system kernel 441. Groups of processes within different namespaces are isolated one from each other, hence each process group may have a unique network stack, dedicated mount points, dedicated IPC (Inter-Process Communication), and a separate process ID subset. Regarding the network stack, the following embodiments may be implemented by the container daemon 403 using the namespace feature. As a first option, a no networking scheme may be implemented such that each container is completely isolated and has no interfaces to talk to the outside world. As a second option, a host networking scheme may be configured such that the container and the host operating system share the same network stack. From a network perspective, there is no isolation. As a third option, a dedicated networking scheme configures the container networking and the host operating system to have distinct network stacks, which are completely independent and can be interconnected using, for example, Linux concepts such as "veth pairs", "bridges" and "ip routing". In an embodiment, the container daemon 403 may select the dedicated networking scheme by default, unless specified otherwise by the developer.

Host operating system kernel 441 may include a cgroups kernel feature for achieving control of resources. For example, the cgroups feature may be configured to limit the amount of resources (e.g., CPU, memory, disk I/O, network, etc.) that are assigned to a specific hierarchy of processes.

As an optional feature, software stack 451 may include a hypervisor component 404, or similar virtualization component, that is configured to support interaction between the guest operating system 415 and a host operating system of a different platform type. For example, in the case where guest operating system 415 was selected to be Linux based while the target device operating system is to be MS Windows based, the hypervisor 404 is configured to operate to support the overlaying of the container image layers onto the host operating system at runtime.

Figure 5:
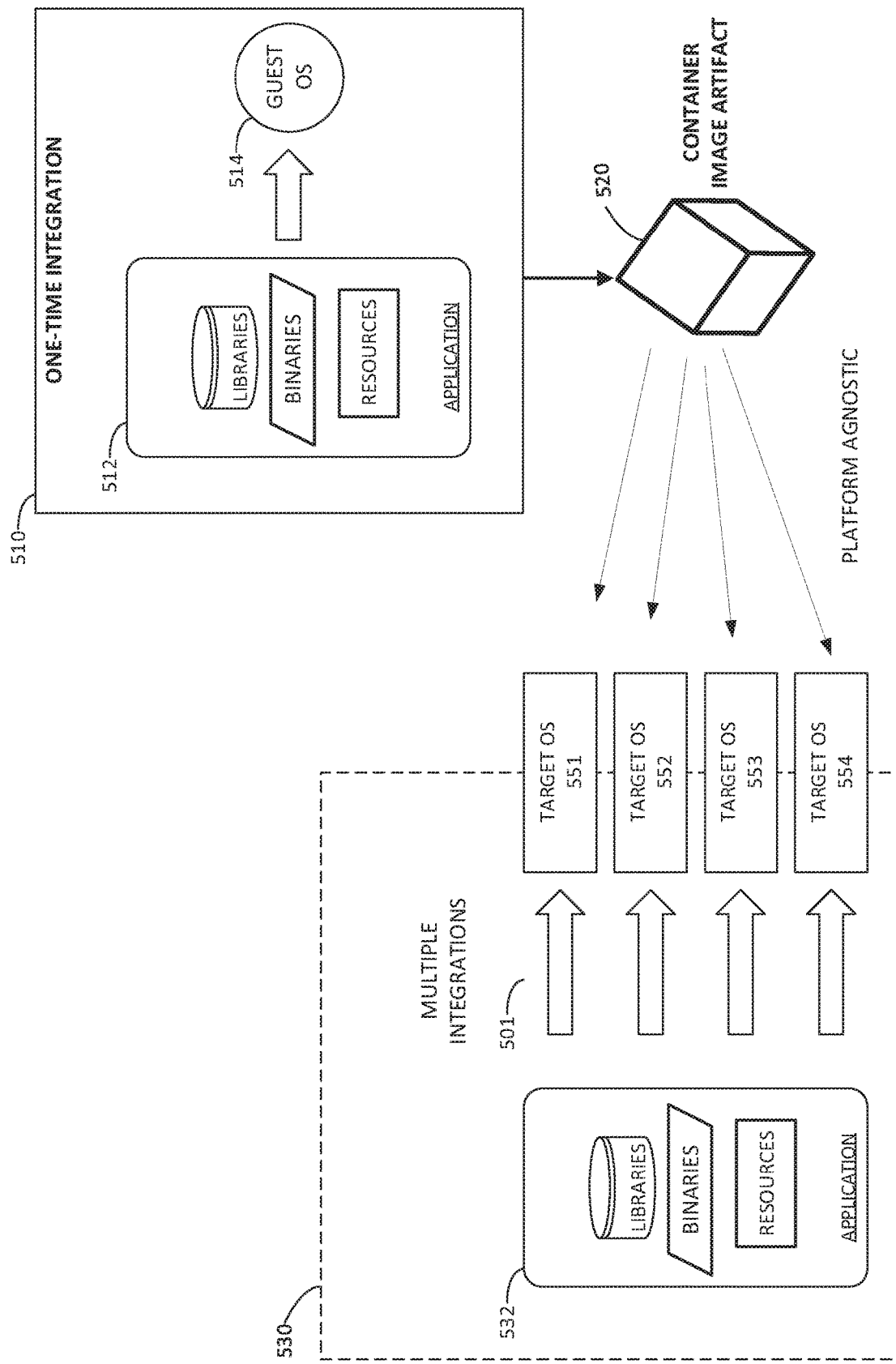
FIG. 5 shows a diagram of a one-time system integration for an application container in accordance with embodiments of the present disclosure.

FIG. 5 shows a diagram of a one-time system integration for an application container in accordance with embodiments of the present disclosure. In an embodiment, a one-time integration 510 of native artifacts of application 512, such as libraries, binaries and resource assignments, to a guest operating system 514 is performed during the development of coding for the application 512. As a result of the one-time integration 510, a container image artifact 520 is constructed which is platform-agnostic to various target operating systems 551, 552, 553, 554 (e.g., OS for deployment on various target supervisory devices). In contrast, repeated integration scheme 530 for native artifacts for application 532, created by a development process without the one-time integration 510 according to embodiments of the present disclosure require repeated system integrations 501, each integration being required for a respective target operating system 551, 552, 553, 554. Another notable advantage of the container artifact 520 is in the simplicity through which the atomic container can be updated to newer versions, such as when the application is required to support new functionalities. For example, an application update may be reintegrated with the guest operating system 514 as a one-time integration 510 to produce the updated container image artifact 520. Examples of instances where an update to application 512 is required include, but are not limited to, a need to add new features or functionalities to the application 512, a need to provide the latest bug fixes to the application 512, and providing security patches to the application 512. To perform the application update across all deployed platforms, the old container image artifact is discarded, replaced with the updated container image artifact 520, and the application is ready to be executed without additional platform-specific integrations. In contrast, an update to application 512 with conventional integration 501 requires update to every single host platform where the application is developed, where the multitude of platforms may have different operating systems 551, 552, 553, 554, different update mechanisms (scripts, installers, etc.) or may even have slightly different system libraries installed, that up to the present time did not create any problem. These nonconformities translate in tedious update cycles that can easily result in misbehaviors or failures when the updated version of the application is executed.

In an embodiment, container updates that involve switching out an old container with a container, either for a single container or for a group of affected containers, may be supported by the container daemon 403 for both public and private image registries. For example, a registry may be a server-side application that stores and distributes images across target devices. A developer may make available each new release by simply pushing it to a registry, from which the device container manager may pull it and store it locally. By the atomic and abstracted nature of the containers, multiple versions of the same container can coexist on a device, letting the system decide at runtime which one to start.

Container-based application construction and deployment as disclosed herein acts in a totally transparent way to real-time kernel features (e.g. FIFO/RR schedulers, real-time priorities), resulting in comparable determinism without any performance penalty such as additional time to execute or quality degradation experienced. In addition, the highly portable nature of the application containers extends to various operating systems. For example, a Linux-based container can run unchanged on any release distribution of a Linux-based or Windows-based host operating system capable of supporting the container runtime, making cross-OS integration an instantaneous process as well, without requiring any change to the application binaries or to its pre-existing guest operating system integration. The portability provides a normalized execution environment whereby the same container can run on various levels of the automation control system, where the supervisory device may be deployed in a panel (e.g., HMI panel), edge device (e.g., an embedded SCADA device), or cloud-based device (a cloud-based SCADA device).

Container-based application construction and deployment as disclosed herein also offers an increased security benefit by providing better application isolation via the individual containers. For example, with reference to FIG. 4, processes running within container 411 cannot see, or affect, processes running in the remaining containers 421, 431, or on the host system kernel 441. In addition, a dedicated networking configuration for a container may be selected as a default option unless specified otherwise.

An additional benefit of the container deployment in accordance with the embodiments of this disclosure is generalized assignment of resources to each container, which allows for better distribution of resources across the different system components.

Figure 6:
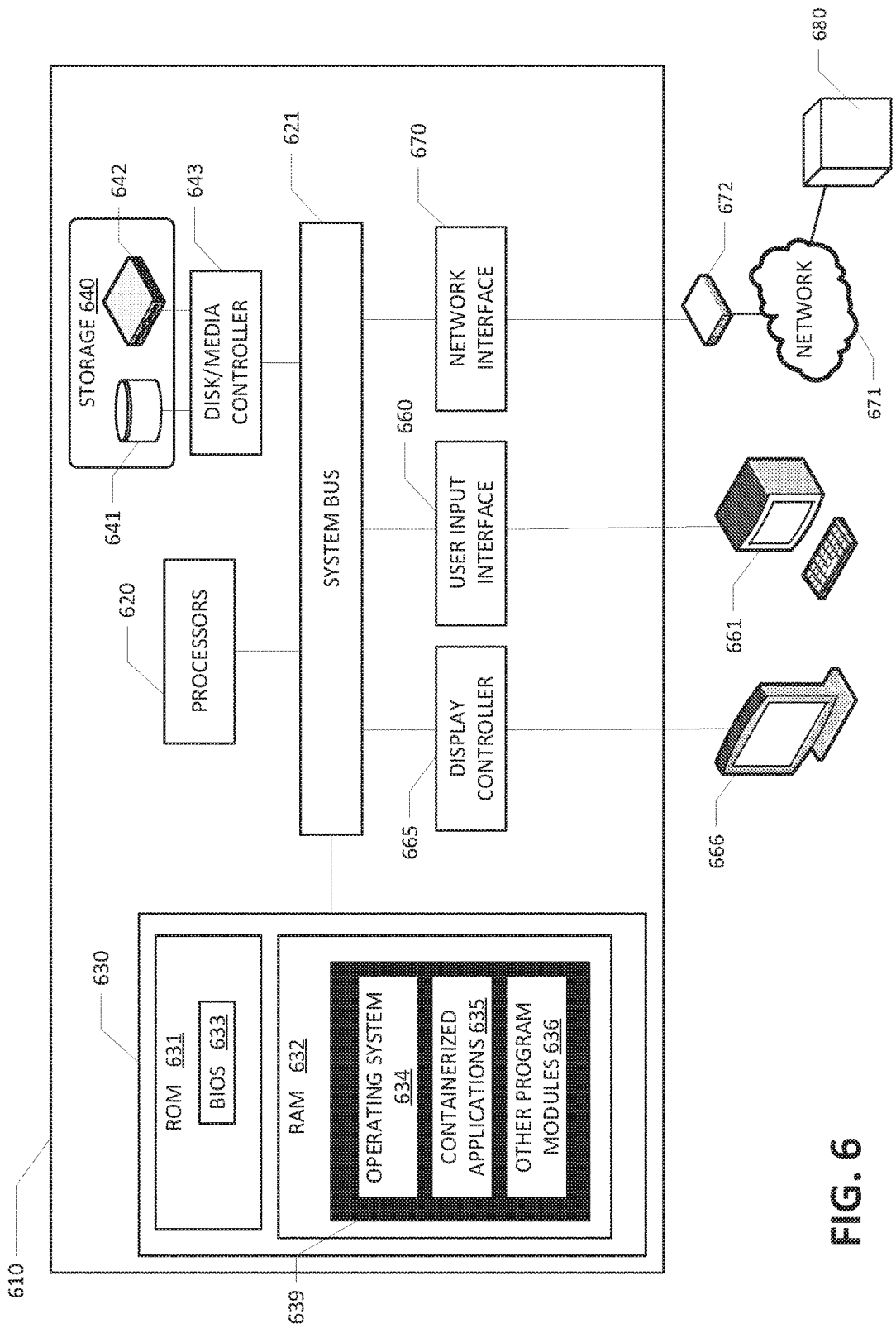
FIG. 6 shows a block diagram of a computing environment example within which embodiments of the disclosure may be implemented

FIG. 6 shows an exemplary computing environment within which embodiments of the disclosure may be implemented. A computer system 610 is shown, which may be implemented as an HMI unit or other type of control system device for industrial automation as described above. As shown in FIG. 6, the computer system 610 may include a communication mechanism such as a system bus 621 or other communication mechanism for communicating information within the computer system 610. The computer system 610 further includes one or more processors 620 coupled with the system bus 621 for processing the information.

The processors 620 may include one or more central processing units (CPUs), graphical processing units (GPUs), or any other processor known in the art. More generally, a processor as described herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a computer, controller or microprocessor, for example, and be conditioned using executable instructions to perform special purpose functions not performed by a general-purpose computer. A processor may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 620 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor may be capable of supporting any of a variety of instruction sets. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

The system bus 621 may include at least one of a system bus, a memory bus, an address bus, or a message bus, and may permit exchange of information (e.g., data (including computer-executable code), signaling, etc.) between various components of the computer system 610. The system bus 621 may include, without limitation, a memory bus or a memory controller, a peripheral bus, an accelerated graphics port, and so forth. The system bus 621 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

Continuing with reference to FIG. 6, the computer system 610 may also include a system memory 630 coupled to the system bus 621 for storing information and instructions to be executed by processors 620. The system memory 630 may include computer readable storage media in the form of volatile and/or nonvolatile memory, such as read only memory (ROM) 631 and/or random access memory (RAM) 632. The RAM 632 may include other dynamic storage device(s) (e.g., dynamic RAM, static RAM, and synchronous DRAM). The ROM 631 may include other static storage device(s) (e.g., programmable ROM, erasable PROM, and electrically erasable PROM). In addition, the system memory 630 may be used for storing temporary variables or other intermediate information during the execution of instructions by the processors 620. A basic input/output system 633 (BIOS) containing the basic routines that help to transfer information between elements within computer system 610, such as during start-up, may be stored in the ROM 631. RAM 632 may contain data and/or program modules that are immediately accessible to and/or presently being operated on by the processors 620. As shown, software stack 639 may include operating system 634, containerized applications 635, and other program modules 636.

The operating system 634 may be loaded into the memory 630, being retrieved from storage 640, and may provide an interface between other application software executing on the computer system 610 and hardware resources of the computer system 610. More specifically, the operating system 634 may include a set of computer-executable instructions for managing hardware resources of the computer system 610 and for providing common services to other application programs (e.g., managing memory allocation among various application programs). In certain example embodiments, the operating system 634 may control execution of one or more of program modules 636, or other program modules (not shown) being stored in the data storage 640. The operating system 634 may include any operating system now known or which may be developed in the future including, but not limited to, any server operating system, any mainframe operating system, or any other proprietary or non-proprietary operating system.

The containerized application 635 may include a set of computer-executable instructions for performing a base functionality of the automation control process, which is the basis for defining any particular application container as previously described. Each of the containerized applications 635 may run independently and may be interfaced with others of the containerized applications 635 in accordance with embodiments of the disclosure.

The computer system 610 may also include a disk/media controller 643 coupled to the system bus 621 to control one or more storage devices for storing information and instructions, such as a magnetic hard disk 641 and/or a removable media drive 642 (e.g., floppy disk drive, compact disc drive, tape drive, flash drive, and/or solid-state drive). Storage devices 640 may be added to the computer system 610 using an appropriate device interface (e.g., a small computer system interface (SCSI), integrated device electronics (IDE), Universal Serial Bus (USB), or FireWire). Storage devices 641, 642 may be external to the computer system 610, and may be used to store image processing data in accordance with the embodiments of the disclosure.

The computer system 610 may also include a display controller 665 coupled to the system bus 621 to control a display or monitor 666, such as a cathode ray tube (CRT) or liquid crystal display (LCD), for displaying information to a computer user. The computer system 610 includes a user input interface 660 and one or more input devices, such as a user terminal 661, which may include a keyboard, touchscreen, tablet and/or a pointing device, for interacting with a computer user and providing information to the processors 620. The user terminal 661 may provide a touch screen interface. Display 666 and/or user terminal 661 may be disposed as a separate device, or as part of a single self-contained unit that encloses the computer system 610.

The computer system 610 may perform a portion or all of the processing steps of embodiments of the invention in response to the processors 620 executing one or more sequences of one or more instructions contained in a memory, such as the system memory 630. Such instructions may be read into the system memory 630 from another computer readable medium, such as the magnetic hard disk 641 or the removable media drive 642. The magnetic hard disk 641 may contain one or more data stores and data files used by embodiments of the present invention. The data store may include, but are not limited to, databases (e.g., relational, object-oriented, etc.), file systems, flat files, distributed data stores in which data is stored on more than one node of a computer network, peer-to-peer network data stores, or the like. The processors 620 may also be employed in a multi-processing arrangement to execute the one or more sequences of instructions contained in system memory 630. In alternative embodiments, hard-wired circuitry may be used in place of or in combination with software instructions. Thus, embodiments are not limited to any specific combination of hardware circuitry and software.

As stated above, the computer system 610 may include at least one computer readable medium or memory for holding instructions programmed according to embodiments of the invention and for containing data structures, tables, records, or other data described herein. The term "computer readable medium" as used herein refers to any medium that participates in providing instructions to the processors 620 for execution. A computer readable medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 641 or removable media drive 642. Non-limiting examples of volatile media include dynamic memory, such as system memory 630. Non-limiting examples of transmission media include coaxial cables, copper wire, and fiber optics, including the wires that make up the system bus 621. Transmission media may also take the form of acoustic or light waves, such as those generated during radio wave and infrared data communications.

Computer readable medium instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable medium instructions.

The computing environment 600 may further include the computer system 610 operating in a networked environment using logical connections to one or more remote computers, such as remote computing device 680. The network interface 670 may enable communication, for example, with other remote devices 680 or systems and/or the storage devices 641, 642 via the network 671. Remote computing device 680 may be a personal computer (laptop or desktop), a mobile device, an embedded Edge device, a web-based server, a gateway, a router, a network PC, a peer device or other common network node, and typically includes many or all of the elements described above relative to computer system 610. When used in a networking environment, computer system 610 may include modem 672 for establishing communications over a network 671, such as the Internet. Modem 672 may be connected to system bus 621 via user network interface 670, or via another appropriate mechanism.

Network 671 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 610 and other computers (e.g., remote computing device 680). The network 671 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 671.

It should be appreciated that the program modules, applications, computer-executable instructions, code, or the like depicted in FIG. 6 as being stored in the system memory 630 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the computer system 610, the remote device 680, and/or hosted on other computing device(s) accessible via one or more of the network(s) 671, may be provided to support functionality provided by the program modules, applications, or computer-executable code depicted in FIG. 6 and/or additional or alternate functionality. Further, functionality may be modularized differently such that processing described as being supported collectively by the collection of program modules depicted in FIG. 6 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 6 may be implemented, at least partially, in hardware and/or firmware across any number of devices.

An executable application, as used herein, comprises code or machine-readable instructions for conditioning the processor to implement predetermined functions, such as those of an operating system, a context data acquisition system or other information processing system, for example, in response to user command or input. An executable procedure is a segment of code or machine-readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters.

The functions and process steps herein may be performed automatically or wholly or partially in response to user command. An activity (including a step) performed automatically is performed in response to one or more executable instructions or device operation without user direct initiation of the activity.

The system and processes of the figures are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. As described herein, the various systems, subsystems, agents, managers and processes can be implemented using hardware components, software components, and/or combinations thereof. No claim element herein is to be construed under the provisions of 35 U.S.C. 112(f), unless the element is expressly recited using the phrase "means for."

What is claimed is:

1. A supervisory device for supervisory and control support in an industrial automation system, the supervisory device comprising:

a processor; and
a computer readable medium having stored thereon a software stack executable by the processor, the software stack comprising:
    a target host operating system designated for the supervisory device; and
    a plurality of independent application containers, each independent application container comprising:
        a modular application being associated with a base functionality for the supervisory device and comprising a plurality of components each configured to perform a subfunctionality, wherein each component has artifacts including a set of binaries, libraries and resources; and
        a guest operating system layer integrated with the artifacts of the plurality of components, wherein the guest operating system layer is platform-agnostic to the target host operating system; and
    a container daemon defining program modules that execute a system integration process during a development stage and program modules that execute a container image artifact during runtime of an operation stage, the container daemon configured to execute a one-time system integration between the guest operating system and the component artifacts by generating a hierarchy of image layers during development of each container to create a container image artifact of each independent application container; wherein for each independent application container, the container daemon is further configured to execute the container image artifact at runtime for integrating each independent application container to the target host operating system; wherein the independent application containers are portable for direct deployment in an operating system of a type different than that of the target host operating system and can run unchanged without requiring any change to the component artifacts.

2. The supervisory device of claim 1, wherein each of the independent application containers comprises:
    a container interface for networking with another container interface;
    wherein the container daemon integrates each independent application container to the guest operating system for operation on the target host operating system with a namespace kernel feature for isolation between the independent application containers according to a networking scheme.

3. The supervisory device of claim 2, wherein the namespace kernel feature dictates a set of resources visible to a specific process group and isolates process groups within different namespaces by assigning each process group a unique network stack, dedicated mount points, dedicated IPC (Inter-process Communication), and a separate process ID subset.

4. The supervisory device of claim 1, wherein the container daemon comprises a compositor module configured to perform a bridging of multi-component applications so that the plurality of independent application containers starts all at once.

5. The supervisory device of claim 4, wherein the container daemon further comprises an orchestrator module configured to schedule, actively monitor and restart a container application in response to a premature termination.

6. The supervisory device of claim 1, wherein the supervisory device is implemented as a panel device, edge device, or cloud-based device.

7. The supervisory device of claim 1, wherein at least one of the modular applications comprises components for execution of runtime server functions in the industrial automation system.

8. The supervisory device of claim 1, wherein at least one of the modular applications comprises components for execution of a web-based rendering host to expose a user interface to a remote browser.

9. The supervisory device of claim 1, further comprising a display, wherein at least one of the modular applications comprises components for execution of visualization functions that expose a user interface on the display.

10. A computer-implemented method for a supervisory device of an industrial automation system, the computer-implemented method comprising:
    constructing, by a processor, a software stack for a target host operating system comprising a plurality of independent application containers and a container daemon defining program modules that execute a system integration process during a development stage and program modules that execute a container image artifact during runtime of an operation stage, wherein each independent application container comprises:
        a modular application being associated with a base functionality for the supervisory device and comprising a plurality of components each configured to perform a subfunctionality, wherein each component has artifacts including a set of binaries, libraries and resources; and
        a guest operating system layer integrated with the artifacts of the plurality of components, wherein the guest operating system layer is platform-agnostic to the target host operating system; and
    executing, by the container daemon, a one-time system integration between the guest operating system layer and the component artifacts by generating a hierarchy of image layers during development of each container to create a container image artifact of each independent application container; and
    executing, by the container daemon at runtime, the container image artifact for integrating each independent application container to the target host operating system;
    wherein the independent application containers are portable for direct deployment in an operating system of a type different than that of the target host operating system and can run unchanged without requiring any change to the component artifacts.

11. The computer-implemented method of claim 10, further comprising:
    identifying an update request for one of the modular applications;
    executing a one-time integration of the guest operating system layer with the application to construct an updated container; and
    replacing the independent application container with the updated container.

12. The computer-implemented method of claim 10, further comprising:
    networking, by a container interface, with another container interface; and
    integrating, by the container daemon, each independent application container to the guest operating system layer for operation on the target host operating system with a namespace kernel feature for isolation between the independent application containers according to a networking scheme.

13. The computer-implemented method of claim 12, wherein the namespace kernel feature dictates a set of resources visible to a specific process group and isolates process groups within different namespaces by assigning each process group a unique network stack, dedicated mount points, dedicated IPC (Inter-process Communication), and a separate process ID subset.

14. The computer-implemented method of claim 10, further comprising:
    performing, by the container daemon, a bridging of multi-component applications so that the plurality of independent application containers starts all at once.

15. The computer-implemented method of claim 10, further comprising:
    scheduling, actively monitoring and restarting, by the container daemon, a container application in response to a premature termination.

\* \* \* \* \*